(12) United States Patent
Neubauer

(10) Patent No.: US 8,727,760 B2
(45) Date of Patent: May 20, 2014

(54) DEVICE FOR PRODUCING THERMOPLASTIC CORRUGATED PIPES

(75) Inventor: Gerhard Neubauer, Königsberg-Römershofen (DE)

(73) Assignee: Unicor GmbH (DE)

( * ) Notice: Subject to any disclaimer, the term of this patent is extended or adjusted under 35 U.S.C. 154(b) by 804 days.

(21) Appl. No.: 12/682,639

(22) PCT Filed: Jun. 6, 2008

(86) PCT No.: PCT/EP2008/004540
§ 371 (c)(1),
(2), (4) Date: Jun. 14, 2010

(87) PCT Pub. No.: WO2009/049690
PCT Pub. Date: Apr. 23, 2009

(65) Prior Publication Data
US 2010/0247704 A1    Sep. 30, 2010

(30) Foreign Application Priority Data

Oct. 12, 2007 (DE) .......................... 10 2007 049 653

(51) Int. Cl.
*B29C 47/06* (2006.01)
*B29C 47/90* (2006.01)

(52) U.S. Cl.
USPC ........ 425/326.1; 425/136; 425/154; 425/186; 425/192 R; 425/336; 425/369; 425/396; 425/462

(58) Field of Classification Search
USPC ....... 425/136, 154, 133.1, 186, 192 R, 326.1, 425/336, 369, 381, 392, 396, 462
See application file for complete search history.

(56) References Cited

U.S. PATENT DOCUMENTS 4,145,387 A * 3/1979 Hegler et al. ................. 264/442
4,255,107 A * 3/1981 Martin .......................... 425/163
(Continued)

FOREIGN PATENT DOCUMENTS

CA    2317871 A1    3/2001
EP    0579128 A1    1/1994
(Continued)

OTHER PUBLICATIONS

International Search Report PCT/EP2008/004540 dated Nov. 20, 2008.

(Continued)

*Primary Examiner* — Dimple Bodawala
*Assistant Examiner* — Joseph Leyson
(74) *Attorney, Agent, or Firm* — Lerner, David, Littenberg, Krumholz & Mentlik, LLP

(57) ABSTRACT

An apparatus for producing thermoplastic corrugated pipes may include an extrusion device with an extruder and an extrusion die device and a corrugator device with traveling mold jaws. The extrusion device and the corrugator device are positionally movable in relation to one another, for example for adjustment. The extrusion device is positionally movable in relation to the corrugator device in a horizontal plane, while the corrugator device is movable exclusively in height here.

13 Claims, 3 Drawing Sheets

(56) References Cited

U.S. PATENT DOCUMENTS

| | | | |
|---|---|---|---|
| 4,293,051 A | | 10/1981 | Nishikawa |
| 4,674,969 A | | 6/1987 | Korn |
| 5,257,924 A | | 11/1993 | Dickhut et al. |
| 5,403,175 A | | 4/1995 | Stroh |
| 6,050,805 A | * | 4/2000 | Lupke .................... 425/326.1 |
| 6,719,942 B1 | * | 4/2004 | Triplett et al. ............... 264/508 |
| 6,939,503 B2 | * | 9/2005 | Hegler ...................... 264/506 |
| 2006/0145389 A1 | | 7/2006 | Schwaiger et al. |
| 2006/0157887 A1 | | 7/2006 | Schwaiger |

FOREIGN PATENT DOCUMENTS

| | | |
|---|---|---|
| EP | 1279486 A2 | 1/2003 |
| WO | 9917916 A1 | 4/1999 |
| WO | 2004037516 A2 | 5/2004 |

OTHER PUBLICATIONS

Office Action from German Paten Application 10 2007 049 653.4-16 dated Oct. 20, 2008.

* cited by examiner

DEVICE FOR PRODUCING THERMOPLASTIC CORRUGATED PIPES

CROSS REFERENCE TO RELATED APPLICATIONS

The present application is a national phase entry under 35 U.S.C. §371 of International Application No. PCT/EP2008/004540, filed Jun. 6, 2008, published in German, which claims the benefit of German Patent Application No. 10 2007 049 653.4, filed Oct. 12, 2007. The disclosures of said applications are incorporated by reference herein.

FIELD

The invention relates to an apparatus for producing thermoplastic corrugated pipes, the apparatus having an extrusion device with an extruder device and an extrusion die device and a corrugator device with traveling mold jaws, and the extrusion device and the corrugator device being positionally movable in relation to one another, for example for adjustment.

BACKGROUND

Known apparatuses of this type with a horizontal direction of production (X direction) provide that the corrugator can be made to move in the direction of production, to be precise on the one hand for adjustment in the X direction and on the other hand to move the corrugator away from the extrusion device in the event of operational failure and for changing the mold. For adjustment in the Y direction, i.e. transversely in relation to the direction of production, and for adjustment in the vertical direction (Z direction), the conventional extrusion devices have corresponding Y and Z adjusting devices.

The moving of the corrugator device when carrying out an adjustment and in particular when moving the corrugator away in the event of operational failure and for changing the mold causes relative displacements with respect to the peripheral devices downstream of the corrugator device, such as downstream cutting and transporting devices. In the case of the conventional installations, these downstream peripheral devices are therefore usually connected in the manner of a concertina connection, which however causes disadvantages in terms of equipment and layout. The disadvantages are particularly great in the case of configurations for producing corrugated pipes of large nominal widths, since the components of the installations are then relatively voluminous and heavy.

SUMMARY

The invention is based on the object of providing an apparatus of the type mentioned at the beginning which is structurally designed in such a way that designs for producing corrugated pipes of large nominal widths can also be created with simple constructions.

The invention achieves this object by the subject matter of the present disclosure. The fact that the extrusion device is positionally movable in relation to the corrugator device, in that the extrusion device can be made to move linearly in the X direction and in the Y direction, makes it possible to design the possibly heavy and voluminous corrugator device without the capability of moving in the X and Y directions. This is of particular advantage if the direction of production is arranged in the X direction. This is so because the capability of the extrusion device of moving in the X direction can then be designed such that on the one hand the adjustment in the X direction and on the other hand the moving of the extrusion device away from the corrugator device in the X direction can be accomplished if an operational failure occurs or a mold change is to be carried out. The corrugator device is preferably designed to be positionally movable in the vertical direction, in order to accomplish the adjustment in the vertical direction by making the corrugator device move in the vertical direction.

In the case of preferred designs, it is provided that the corrugator device is movable such that it is positionally movable exclusively in the vertical direction and therefore is not positionally movable in the X direction or in the Y direction. In the case of modified designs, however, the corrugator device may also additionally be positionally movable in both the other directions. Furthermore, designs in which the extrusion device is positionally movable in the X, Y and Z directions are conceivable.

In the adjustment, the adjusting devices that are present on the extrusion device and on the corrugator device may complement one another with an identical direction in the movement path, whereby simplifications in the structural design of the individual adjusting devices and handling advantages in the adjustment can be obtained.

BRIEF DESCRIPTION OF DRAWINGS

Further features and advantages of the invention emerge from the following description of an exemplary embodiment with reference to the figures, in which.

DETAILED DESCRIPTION

Figure 1:
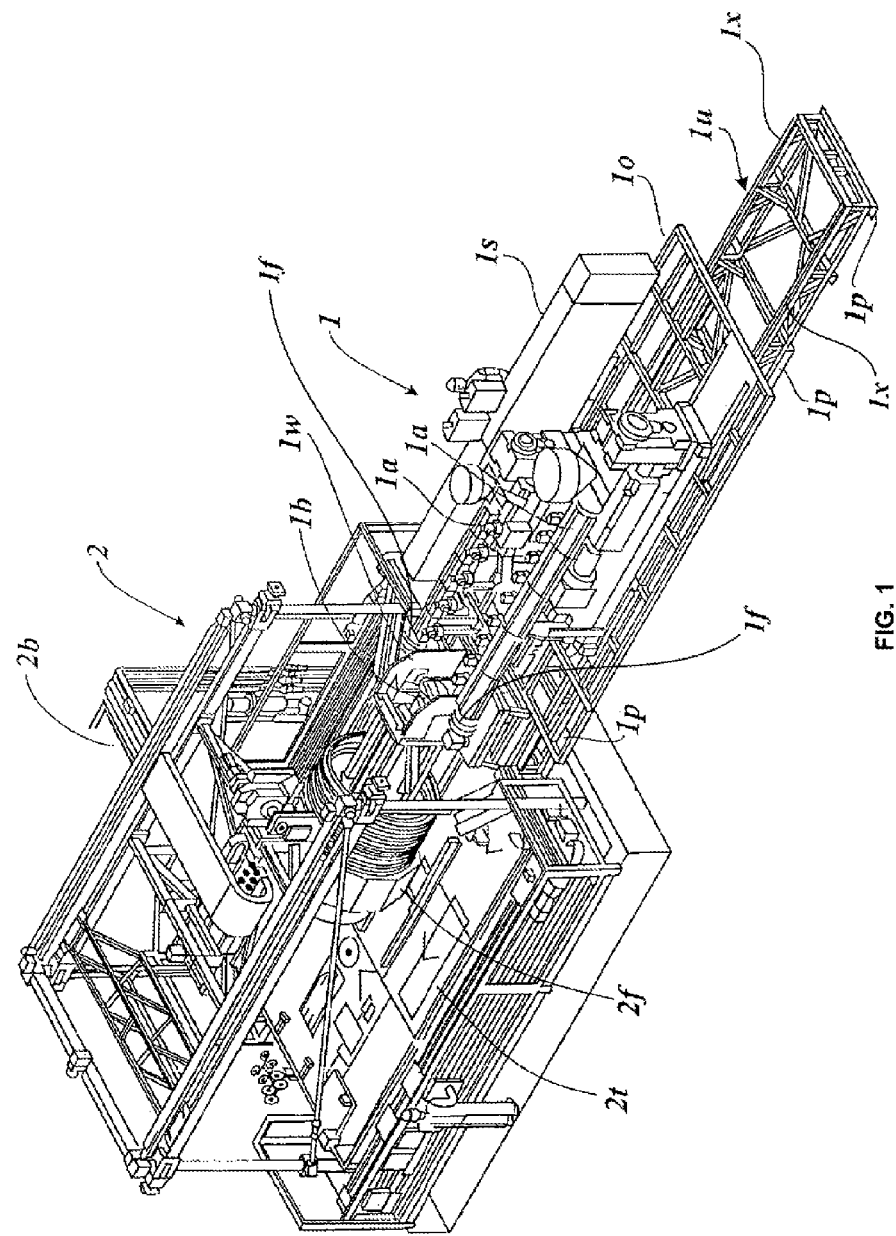
FIG. 1 shows a perspective view of an exemplary embodiment of the apparatus for producing thermoplastic corrugated pipes with an extrusion device and a corrugator device, seen obliquely from above.
Figure 2:
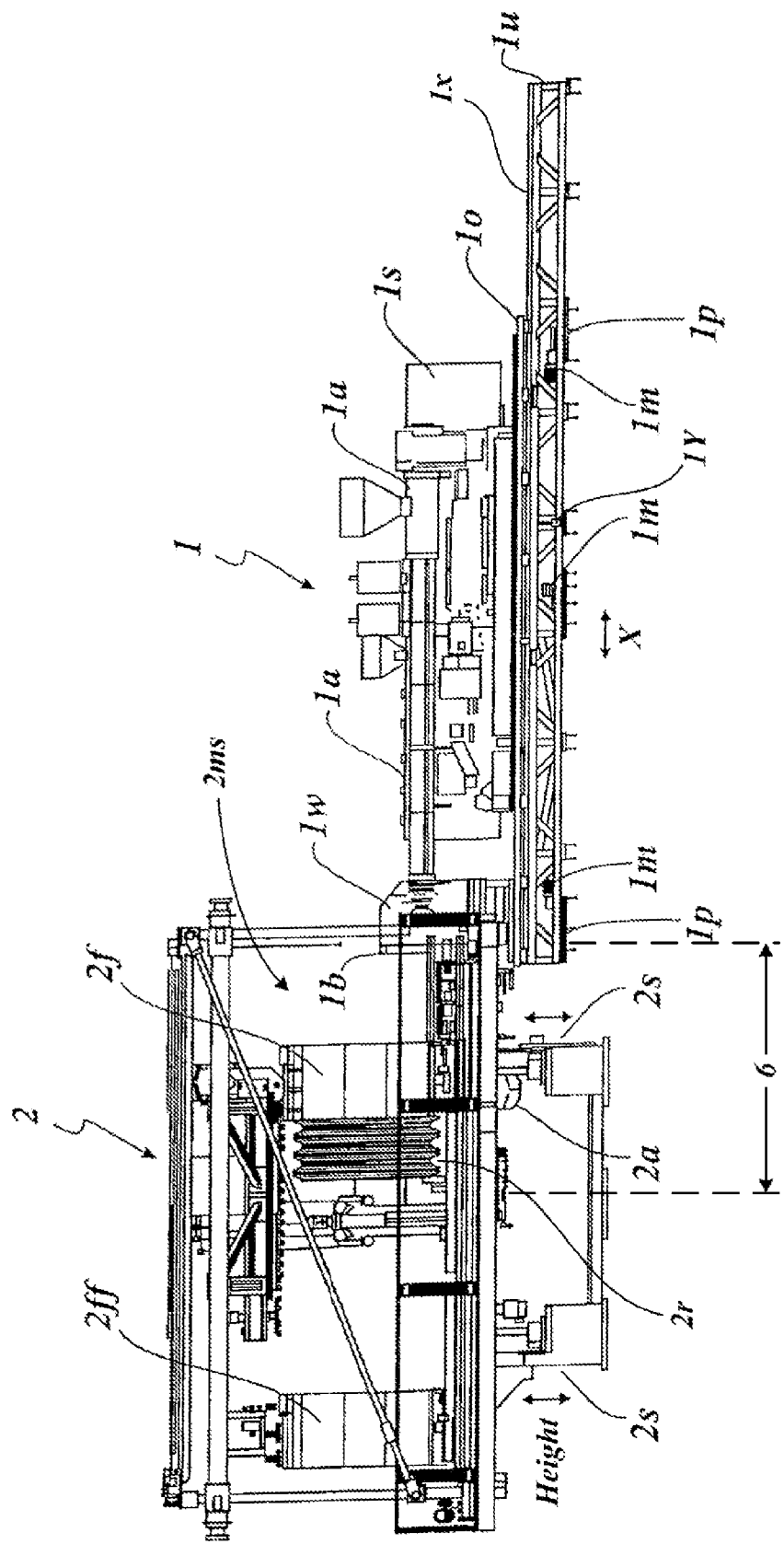
FIG. 2 shows a side view of the exemplary embodiment in FIG. 1.
Figure 3:
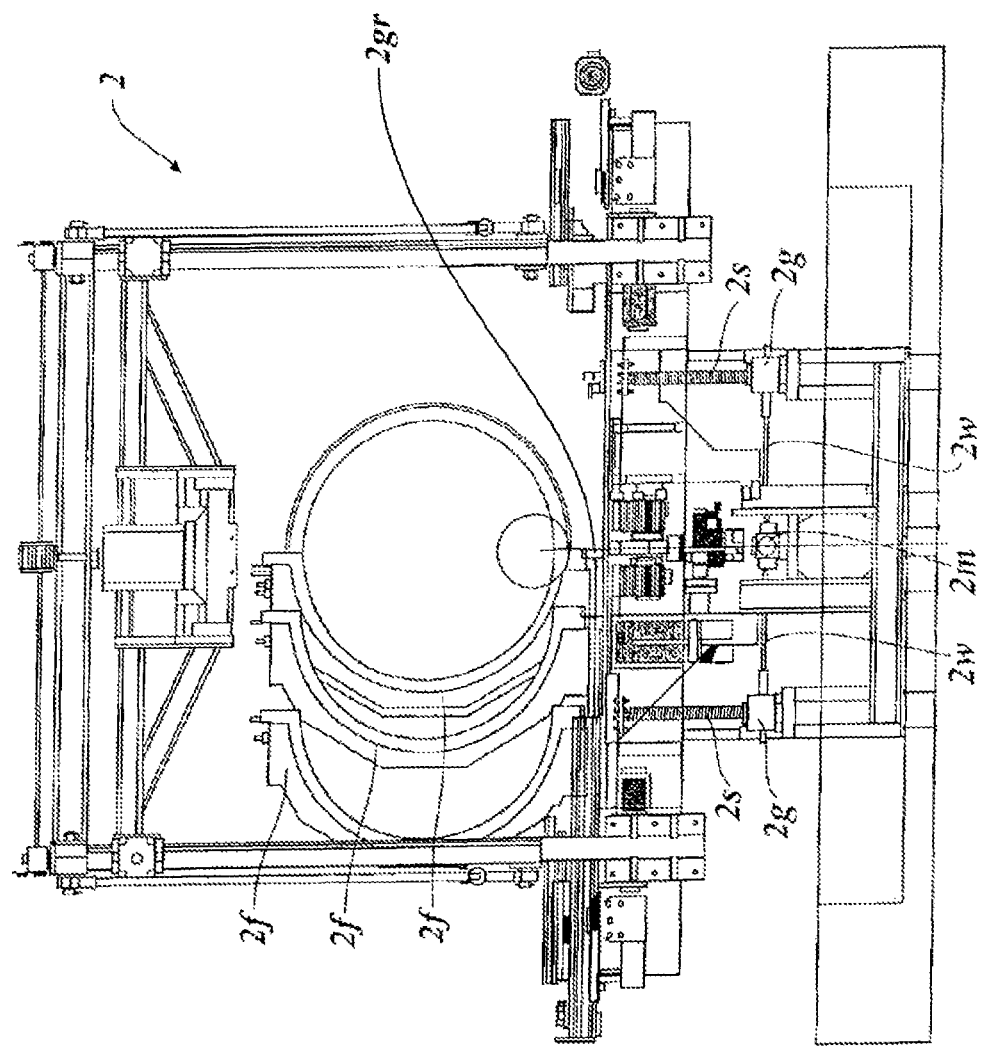
FIG. 3 shows a sectional end-on view of the corrugator device of the exemplary embodiment in FIG. 1.

The apparatus represented in the figures has as the main components an extrusion device 1 and a corrugator device 2. In the case represented, the extrusion device 1 is made up of two extruders 1a and a common die device 1b. The extrusion device 1 has a frame 1o, on which the two extruder devices 1a and the common die device 1b are installed. The common die device 1b is exchangeably mounted on an angular stand 1w fixedly installed on the frame 1o. The extruders 1a are mounted displaceably along the direction of production by means of rollers on rails on the frame 1o. The extruder devices 1a are connected to the die device 1b by means of flexible lines 1f. In addition, a switch cabinet is arranged on the frame 1o.

The frame 1o with the components 1a and 1b arranged on it is mounted on a lower base frame 1u. Arranged on the lower base frame 1u is a linear rail device 1x, which runs in the X direction and in which the upper frame 1o is linearly displaceable in the X direction by means of a ball bearing guide. The sliding guidance in the X direction allows the extrusion devices with the extruders 1a together with the die device 1b to be displaced by about 3 m away from the corrugator device 2 in the event of operational failure or in the case of a mold change. Furthermore, the sliding guidance allows the extruder device to be moved in the X direction in the course of adjustment on the frame 1o.

The base frame 1u can be made to move in the Y direction, i.e. transversely to the X direction, on fixedly installed base plates 1p. Arranged for this purpose on the base plates 1p are rail devices 1Y, which run in the Y direction and in which the lower base frame 1u is displaceable by means of rollers. The sliding guidance in the Y direction allows the extrusion device to move in the Y direction in the course of the adjustment.

To provide propulsion for the movement in the X direction, hydraulic drives with hydraulic pressure cylinders are provided. They are mounted on the lower base frame 1u and act on the upper frame 1o. Provided in case of emergency is a pressure accumulator, which ensures that the extrusion device is moved sufficiently far away from the corrugator by means of the hydraulic drive even in the event of a power failure. When the hydraulic drives are switched off, the frame 1o is arrested on account of the self-locking of the hydraulic drives. Consequently, the frame 1o, and with it the extrusion device 1, can be arrested in a selectable position on the base frame 1u in the course of the adjustment in the X direction by means of the switching off of the hydraulic drives.

To provide propulsion for the movement in the Y direction, electric geared motors are provided, each providing propulsion by means of cardan shaft rams. In the case represented, three such geared motors 1m are provided. The geared motors 1m are mounted in fixed base plates 1p. The driven rams are mounted in gearboxes on the base plates and act on the base frame 1u in the sense of providing propulsion in the Y direction in the adjustment. When the geared motors 1m are switched off, the base frame 1u is arrested on account of the self-locking of the gear mechanisms. Consequently, the base frame 1u, and with it the extrusion device 1, can be arrested in a selectable position on the base plates 1p in the course of the adjustment in the Y direction by means of the switching off of the geared motors.

The corrugator device 2 comprises a machine table 2t, which in the case represented is horizontal, with mold jaws 2f guided on it. In the representation in FIG. 1, only one of the corrugator mold jaws if is shown in order to provide a clearer overall view. Pairs of the mold jaws 2f respectively form a mold cavity. The mold jaw halves are guided on the machine table 2t in a linear molding section 2ms to form a linear mold channel 6. In this linear molding section, the pairs of mold jaws are guided such that they are arranged in series one behind the other. The propulsion for the mold jaws 2f in the molding section 2ms is provided by a drive motor 2a, which is arranged in the machine table 2t and has an output pinion 2r. The output pinion 2r meshes here with the bottom toothed racks of the mold jaws guided in the molding section. Consequently, the mold jaws are advanced in the molding section in the X direction away from the extrusion device. By means of grippers 2gr, the mold jaws 2f are returned from the end of the molding section 2ms to the beginning of the molding section. The beginning of the molding section 2ms follows on directly from the die device 1b. The die device may protrude here into the mold channel, to be precise preferably to the extent that the end of the die from which the tube of polymer melt emerges from the die device already lies in the mold cavity enclosed by the corrugator jaws. It reaches into the cooling mandrel of the die device. The axis of the mold channel 6 is linearly in line with the axis of the die device 1b and forms the axis of the direction of production X.

The corrugator device 2 operates as follows:

The tube of polymer melt emerging from the die device. 1b passes through the mold channel of the pair of mold jaws arranged one behind the other in the molding section. The tube of melt is thereby cooled and molded to form a corrugated pipe. At the end of the mold channel, the finished corrugated pipe emerges as a continuous pipe.

For the molding and cooling in the mold channel, the corrugator device 2 has vacuum and cooling devices known per se. In the present case, these are not specifically represented in the figures. In the case represented, these vacuum and cooling devices are supplied by means of a supply bridge 2b arranged above the machine table 2t.

The corrugator device 2 is adjustable in the vertical direction, in that the position of the machine table 2t can be changed in the vertical direction by means of pushing spindles. Four pushing spindles 2s are provided. They are arranged in the region of the corners of the machine table 2t, which is rectangular in plan view, to be precise two pushing spindles 2s at the front, i.e. in the region of the beginning of the molding section, and two pushing spindles 2s at the rear, i.e. in the region of the end of the molding section.

The pushing spindles 2s are respectively mounted such that they are axially displaceable in the vertical direction, in a threaded nut 2g mounted rotatably in a fixed bearing block. At their upper free end, the pushing spindles 2s respectively act on the underside of the corrugator table 2t.

The front and rear pairs of pushing spindles are respectively driven by means of a front and rear geared motor 2m. The geared motor 2m drives the two pushing spindles 2s of the respective pair of pushing spindles synchronously by means of a common output shaft 2w.

The case represented concerns an apparatus for producing corrugated pipes of large nominal width, i.e. in the range of nominal widths from 600 to 2400 mm, preferably for nominal widths of 1800 mm. Because of the large mold jaws 2f that are used, the corrugator device 2 is relatively voluminous and heavy. Usually six pairs of mold jaws with a further pair of socket-type mold jaws are used on the machine table 2t, so that the overall weight of the corrugator device 2 is of the order of 60 t. It is therefore of significant advantage if the corrugator device 2 does not have to have an adjusting device in the X and/or Y direction but only an adjusting device in the vertical direction, as is the case in the exemplary embodiment that is represented in the figures.

In the case represented, the adjustment in the X and Y directions takes place by means of the relevant X and Y adjusting devices of the extrusion device 1. A major advantage in this connection is that the setting device in the X direction both accomplishes the adjustment in the X direction and allows the displacing movement of the extrusion device 1 away from the corrugator device 2 if an operational failure occurs or a mold change is performed. A movement path of 3 m is available for this case.

In modified exemplary embodiments, the extrusion device 1 may also have in addition to the adjusting device in the X and Y directions an adjusting device in the vertical direction. In such a case, the vertical adjustment may then also take place by means of the vertical displacement of the extrusion device 2.

LIST OF DESIGNATIONS

1 Extrusion device
1a Extruder
1b Die device
1o Frame
1w Angular stand
1f Flexible line
1s Switch cabinet
1u Base frame
1x Rail device 1p Base plate
1x Rail device
1m Electric drive motor
2 Corrugator device
2t Machine table
2f Mold jaws
2ff Socket-type mold jaws
2ms Linear molding section
2a Drive motor
2r Output pinion
2gr Gripper
2b Supply bridge
2s Pushing spindle
2g Threaded nut
2m Geared motor
2w Output shaft

The invention claimed is:

1. An apparatus for producing thermoplastic corrugated pipes,
the apparatus being designed for producing corrugated pipes of nominal widths in a range from 600 to 2400 mm,
the apparatus having an extrusion device with first and second extruders and a common extrusion die device and a corrugator device with traveling mold jaws, and the extrusion device and the corrugator device being positionally movable in relation to one another for adjustment,
wherein
the extrusion device is positionally movable in relation to the corrugator device in a horizontal plane
a) in that the extrusion device is made movable linearly in a X direction, the X direction extending parallel to a direction of production defined by an axis of the common extrusion die device or extending in line with the direction of production,
b) in that the extrusion device is made movable linearly in a Y direction, the Y direction extending transversely to the X direction, and
wherein
c) the corrugator device is positionally movable exclusively in the vertical direction, wherein the corrugator device is not positionally movable in the X direction or the Y direction, or
d) the corrugator device is positionally movable exclusively in the vertical direction and in the Y direction, wherein the corrugator device is not positionally movable in the X direction,
wherein the extrusion device has a bearing frame, which is supported on a base frame, the base frame being movable on a first rail device and the bearing frame being movable on a second rail device arranged on the base frame, and
wherein the common extrusion die device is exchangeably mounted on an angular stand fixedly installed on the bearing frame and the first and second extruders are mounted to be selectively displaceable along the direction of production on respective first and second rails on the bearing frame.

2. The apparatus as claimed in claim 1, wherein the base frame can be made to move in the Y direction and the bearing frame can be made to move in the X direction.

3. The apparatus as claimed in claim 1, wherein the base frame can be made to move in the X direction and the bearing frame can be made to move in the Y direction.

4. The apparatus as claimed in claim 1, wherein the extrusion device is movable in the X direction by means of a manual or motorized drive.

5. The apparatus as claimed in claim 1, wherein the extrusion device is movable in the X direction by means of a motorized drive, and the motorized drive in the X direction is formed as a hydraulic drive.

6. The apparatus as claimed in claim 1, wherein the extrusion device is movable in the Y direction by means of a manual or motorized drive.

7. The apparatus as claimed in claim 1, wherein at least one of the extrusion device or the corrugator device is movable in the vertical direction respectively by means of a manual or motorized drive.

8. The apparatus as claimed in claim 1, wherein the corrugator device has an overall weight of the order of 60 tons.

9. The apparatus as claimed in claim 5, wherein the motorized drive in the X direction is formed with a pressure accumulator for emergency actuation.

10. The apparatus as claimed in claim 8, wherein the corrugator device comprises pairs of corrugator mold jaws and one pair of socket-type mold jaws.

11. The apparatus as claimed in claim 1, wherein the apparatus is designed for producing corrugated pipes of nominal widths of 1800 mm.

12. The apparatus as claimed in claim 1, wherein the first rail device is fixedly arranged.

13. An apparatus for producing thermoplastic corrugated pipes, the apparatus being designed for producing corrugated pipes of nominal widths in a range from 600 to 2400 mm, the apparatus comprising:
an extrusion device with first and second extruders and a common extrusion die device;
a corrugator device with traveling mold jaws, the extrusion device and the corrugator device being positionally movable in relation to one another for adjustment;
wherein the extrusion device is positionally movable in relation to the corrugator device in a horizontal plane
a) in that the extrusion device is made movable linearly in a X direction, the X direction extending parallel to a direction of production defined by an axis of the extrusion die device or extending in line with the direction of production, and
b) in that the extrusion device is made movable linearly in a Y direction, the Y direction extending transversely to the X direction;
wherein the corrugator device is positionally movable exclusively in the vertical direction and in the Y direction and not positionally movable in the X direction;
wherein the extrusion device has a bearing frame, which is supported on a base frame, the base frame being movable on a first rail device and the bearing frame being movable on a second rail device arranged on the base frame; and
wherein the common die device is exchangeably mounted on an angular stand fixedly installed on the bearing frame and the first and second extruders are mounted to be selectively displaceable along the direction of production on respective first and second rails on the bearing frame; and
wherein the corrugator device is movable in the Y direction by means of a manual or motorized drive.

* * * * *

UNITED STATES PATENT AND TRADEMARK OFFICE
CERTIFICATE OF CORRECTION

| | | |
|---|---|---|
| PATENT NO. | : 8,727,760 B2 | Page 1 of 1 |
| APPLICATION NO. | : 12/682639 | |
| DATED | : May 20, 2014 | |
| INVENTOR(S) | : Gerhard Neubauer | |

It is certified that error appears in the above-identified patent and that said Letters Patent is hereby corrected as shown below:

Claims

Column 6, line 22, Claim 10, after "comprises" insert --six--.

Signed and Sealed this
Sixteenth Day of February, 2016

Michelle K. Lee
*Director of the United States Patent and Trademark Office*